US010536267B2

(12) United States Patent
Conway et al.

(10) Patent No.: US 10,536,267 B2
(45) Date of Patent: Jan. 14, 2020

(54) CRYPTOGRAPHIC SERVICES UTILIZING COMMODITY HARDWARE

(71) Applicant: Visa International Service Association, San Francisco, CA (US)

(72) Inventors: Adam Conway, Sunnyvale, CA (US); Avinash Kalgi, Kirkland, CA (US)

(73) Assignee: Visa International Service Association, San Francisco, CA (US)

( * ) Notice: Subject to any disclaimer, the term of this patent is extended or adjusted under 35 U.S.C. 154(b) by 120 days.

(21) Appl. No.: 15/706,575

(22) Filed: Sep. 15, 2017

(65) Prior Publication Data

US 2019/0089529 A1    Mar. 21, 2019

(51) Int. Cl.
*H04L 29/06* (2006.01)
*H04L 9/08* (2006.01)
*G06F 21/60* (2013.01)

(52) U.S. Cl.
CPC .......... *H04L 9/0819* (2013.01); *G06F 21/602* (2013.01); *H04L 9/08* (2013.01); *H04L 9/0816* (2013.01); *H04L 9/0877* (2013.01); *H04L 9/0894* (2013.01); *H04L 63/0428* (2013.01); *H04L 2209/76* (2013.01)

(58) Field of Classification Search
CPC ..... H04L 9/0877; H04L 9/08; H04L 2209/76; G06F 21/602
See application file for complete search history.

(56) References Cited

U.S. PATENT DOCUMENTS

| | | | | |
|---|---|---|---|---|
| 6,587,837 | B1 * | 7/2003 | Spagna | G06F 21/10 705/26.43 |
| 9,197,696 | B1 * | 11/2015 | Jakatdar | H04L 67/06 |
| 2003/0177401 | A1 * | 9/2003 | Arnold | H04L 9/0863 713/155 |
| 2006/0072762 | A1 * | 4/2006 | Buer | G06F 21/72 380/277 |
| 2009/0187772 | A1 * | 7/2009 | Lange | G06F 21/10 713/193 |
| 2010/0254537 | A1 | 10/2010 | Buer et al. | |
| 2010/0262831 | A1 * | 10/2010 | Cheng | H04L 63/0853 713/176 |

(Continued)

FOREIGN PATENT DOCUMENTS

EP    2670105    12/2013

OTHER PUBLICATIONS

PCT/US2018/040768, "International Search Report and Written Opinion", dated Dec. 27, 2018, 12 pages.

*Primary Examiner* — Thaddeus J Plecha
(74) *Attorney, Agent, or Firm* — Kilpatrick Townsend & Stockton LLP

(57) ABSTRACT

The solution herein describes a software module that works in combination with certain hardware (e.g., a particular chipset) to obtain the level of security provided by an HSM. The software module can be implemented on a commodity server. The software module can utilize an HSM or key custodian to obtain cryptographic keys. The cryptographic keys may be stored on the commodity server within a secure memory space managed by the commodity server's chip set. While stored, access to the cryptographic keys may be managed by the chip set. The chip set can ensure that only protected applications associated with the cryptographic keys may access said keys.

16 Claims, 7 Drawing Sheets

(56) References Cited

U.S. PATENT DOCUMENTS

| | | |
|---|---|---|
| 2012/0254627 A1 | 10/2012 | Dellow |
| 2014/0037093 A1 | 2/2014 | Park et al. |
| 2014/0089202 A1* | 3/2014 | Bond .................... H04L 9/0822 |
| | | 713/166 |
| 2014/0250303 A1 | 9/2014 | Miller et al. |
| 2015/0278531 A1* | 10/2015 | Smith ................. G06F 21/6218 |
| | | 713/165 |
| 2016/0188910 A1* | 6/2016 | Nakkiran ................ G06F 21/72 |
| | | 713/192 |
| 2018/0205711 A1* | 7/2018 | Kumar .................... H04L 63/06 |
| 2018/0337775 A1* | 11/2018 | Camenisch ............. H04L 9/008 |

\* cited by examiner

CRYPTOGRAPHIC SERVICES UTILIZING COMMODITY HARDWARE

BACKGROUND

A crucial task in cybersecurity is to protect valuable and sensitive information from being accessed by unauthorized parties. To protect complex computing systems, various security considerations should be addressed. For example, to ensure some degree of security, a system should not be physically accessible to unauthorized users; procedures used to secure system data should be reliable; and storage, access, manipulation, and transmission of system data should be safeguarded.

Conventional systems may utilize hardware security modules to address these security considerations in order to reduce cybersecurity risks. A hardware security module (HSM) may be used to perform various functions such as cryptographic key management and cryptographic operations (e.g., encryption, decryption, hashing, digital signature generation/verification, Message Authentication Codes (MAC) generation/verification, etc.). However, an HSM is a purpose-built machine that can be costly to procure and difficult to update. In HSM systems in which many key-related operations and/or cryptographic operations are required, scaling to meet such demands can be difficult, and thus, systems utilizing HSMs can experience increased latency. Accordingly, conventional cybersecurity systems present significant drawbacks with respect to cost, scalability, and performance.

BRIEF SUMMARY

Embodiments described here address the problem described above and other problems individually and collectively. A cybersecurity system can be used to perform cryptographic operations such an encryption, decryption, hashing, calculating message authentication codes and for validating any of the above. A chip set of a computing device can be used to obtain and store cryptographic keys in a secure memory space that is encrypted and managed by the chip set. This secure memory space may be accessed by a processor of the chip set to perform functionality of a protected application such that content (e.g., cryptographic keys) and functionality of the application is inaccessible to other systems, devices, or applications. By utilizing the protected content, the chip set may perform secure cryptographic operations traditionally performed by hardware security modules in a more cost effective, scalable, and efficient manner.

Other embodiments are directed to systems and non-transitory computer readable media associated with methods described herein.

A better understanding of the nature and advantages of embodiments of the present invention may be gained with reference to the following detailed description and the accompanying drawings.

TERMS

Figure 1:
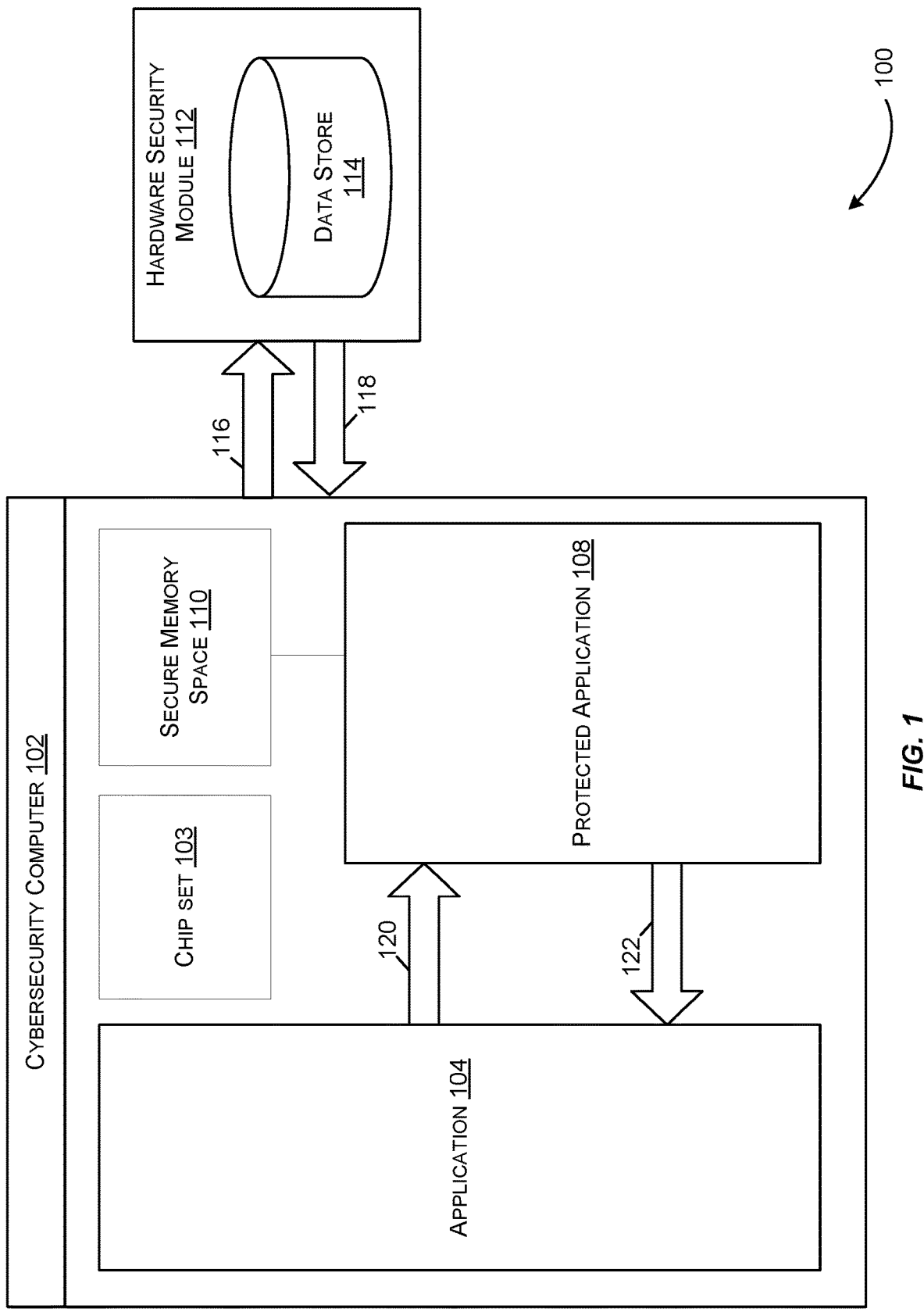
FIG. 1 is a block diagram of a system for obtaining a cryptographic key from a hardware security module for performing cryptographic operations according to some embodiments.

Prior to discussing embodiments of the invention, description of some terms may be helpful in understanding embodiments of the invention.

The term "computing device" generally refers to a computer that requests information or a service. A computing device may comprise a computer (e.g., desktop computer), a mobile device (e.g., a smart phone, laptop, or tablet computer), or a wearable device (e.g., a smart watch or activity tracker). The computing device may include wireless communication capabilities (e.g., Wi-Fi, Bluetooth, or near-field communications). In some embodiments, a computing device computer may communicate with a server computer.

The term "cybersecurity computer" may include a powerful computer or cluster of computers. For example, the cybersecurity computer can be a large mainframe, a mini-computer cluster, or a group of server computers functioning as a unit. The cybersecurity computer may be coupled to one or more databases and may include any hardware, software, other logic, or combination of the preceding, for servicing requests from one or more client computers. The cybersecurity computer may provide cryptographic operations as a service to one or more client computers (or applications running on the client computers). The cybersecurity computer may comprise one or more computational apparatuses and may use any of a variety of computing structures, arrangements, and compilations for servicing the requests from one or more client computers/applications.

The term "hardware security module" may include hardware and/or associated software that performs security-related operations. The security-related operations may include key generation and management and cryptographic operations such as encryption, decryption, hashing, generation of digital signatures, generation of a Message Authentication Codes (MACs). A hardware security module may offer at least some degree of physical tamper-resistance and may include a user interface and/or a programmatic interface.

Hardware security modules may also be known as a secure application module, a hardware cryptographic device, or cryptographic module.

The term "key custodian" may include a trusted party responsible for managing a set of keys.

The terms "cryptographic key" (also referred to herein as a "key") may refer to a string of bits used by a cryptographic algorithm to transform plain text into cipher text or vice versa. A key may remain private to ensure secure communications.

The term "protected application" may include a software application that is associated with a secure memory space.

The execution of functionality of the protected application may be managed by a chip set such that function/method calls of the application may access data contained in a secure memory space.

The term "chip set" may include a set of electronic components in an integrated circuit that manage data flow between a processor, memory and peripherals of a computing device. A chip set may include code that may be executed to initialize and manage access to any number of secure memory spaces.

The term "secure memory space" may include an isolated region of memory that is accessed only with application code that is associated with the same secure memory space. Secure memory spaces may be initialized and managed by a chip set such that content of the secure memory space is cryptographically hashed by a private key of the chip set. Content of the secure memory space may be protected even from privileged software such as virtual machine monitors, BIOS, or operating systems. A chip set may enforce access control for accessing content in the secure memory space.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic operation" may include any suitable operation for securing communications to prevent data from being accessed by unintended parties. Some cryptographic operations may include executing a cryptographic algorithm associated with encryption, decryption, hashing, hash validation, MAC calculation, MAC validation, or the like. Examples of cryptographic algorithms may include Triple Data Encryption Standard (DES) algorithm, RSA, Blowfish, Advance Encryption Standard (AES).

The term "commodity hardware" may include standard-issue computing devices that are different from specialized or high-performance computers.

An "application" may be computer code or other data stored on a computer readable medium (e.g. memory element or secure element) that may be executable by a processor to complete a task.

DETAILED DESCRIPTION

The systems and methods described herein provide techniques for providing a cryptographic service for performing cryptographic operations utilizing commodity hardware. A cybersecurity system may utilize a chip set to initialize and manage secure memory spaces such that protected applications may perform secure cryptographic operations as a service.

Encrypting sensitive information is crucial when storing the information, e.g., to be PCI-compliant or for data privacy issues. Conventional techniques utilize hardware security modules (HSMs) to encrypt and decrypt the information on behalf of a client computer (e.g., a website). By utilizing an HSM, encrypted information is secure at rest and only accessible via cooperation with the HSM (e.g., when viewing private data). However, such modules are expensive and are typically dedicated to cryptographic operations. When traffic is increased, such modules may be overloaded and the system can experience increased latency. Additionally, because HSMs are hardware based, it can be difficult to scale such resources according to current network traffic conditions.

One advantage of the systems and methods described herein is that commodity hardware may be utilized for performing cryptographic operations in lieu of more costly specialized hardware (e.g., HSMs). A commodity server can be configured with security module that utilizes device-specific encryption and a protected software application (whose code and data are encrypted, but can operate on a standard processor). Embodiments can use the Intel SGX chip set (or other similar chipset). The security module can then encrypt or provide hashes, as requested (e.g., by client computers, other applications, etc.).

Upon initialization, the security module of a server may be configured to utilize a secure memory space where the secure memory space is automatically encrypted using a device-specific key. The secure memory space may be allocated, encrypted, and managed by a chip set such that data and processes utilizing the secure memory space are protected (e.g., encrypted) from processes, even when running on the CPU—core dumps would only include encrypted data.

In one example, the security module may be initialized with an encrypted key (e.g., from a key custodian). To decrypt the encrypted key, the security module may initiate a secure communications channel (e.g., a transport layer security (TLS) tunnel) with an HSM. Data sent via the secure communications channel can be encrypted (e.g., utilizing a shared key) between the security module and the HSM to obfuscate data that is sent between the security module and the HSM. Once initiated, the secure communications channel can be utilized by the security module to pass the encrypted key to a standard HSM for decryption. Alternatively, a key can be entered by a user as clear text upon in an initialization process.

The decrypted key can be returned to the security module utilizing the same or another secure communications channel. By utilizing the encryption mechanism of the secure communications channel, the decrypted key can be encrypted (via a mechanism readable by the security module, such as ECDH or public key encryption) and securely transmitted to the security module. Once received, the security module can store the decrypted key in an encrypted state within the secure memory space managed by the Intel SGX chip set (or other chipset). Thus, the key (i.e., decrypted) may be utilized by the security module, while at the same time being encrypted and unusable from the prespective of other systems or processes outside of the secure memory space. Accordingly, the security module may utilize the decrypted key for future encryption/decryption, hashing, or any suitable cryptographic operations.

Thus, reliance on an HSM for encryption and decryption is eliminated. While the HSM may perform key management operations, encryption and decryption operations can be performed by other, less costly, commodity servers configured with the security module without sacrificing the level of security realized with conventional HSMs. Additionally, by utilizing the techniques described herein, the system processing power (e.g., number of servers) can be increased with less difficulty and less cost because the increase in processing power is not dependent on the number of HSMs in the system.

I. Cybersecurity System and Related Infrastructure

In some embodiments, a cybersecurity system may include a cybersecurity computer that provides secure cryptographic operations. A cybersecurity computer may obtain a cryptographic key from an HSM to be used for encryption and decryption purposes.

A protected application may perform the cryptographic operation utilizing the cryptographic key stored and provide the resultant data to the requestor. In systems in which the number of cryptographic operation requests may fluctuate, the number of cybersecurity computers performing cryptographic operations may be increased or decreased as needed, for a fraction of the cost of utilizing HSMs to perform the same operations.

A. Initialization Using an HSM

FIG. 1 is a block diagram of a system 100 for obtaining a cryptographic key from a hardware security module for performing cryptographic operations according to some embodiments. The cybersecurity computer 102 may be any suitable computing device (e.g., mainframes, desktop or laptop computers, tablets, mobile devices, etc.) for executing an application 104. The application 104 can be any suitable system software (e.g., an operating system) or application software (e.g., a database program, word processing program, web browser application, email application, a media player, etc.). The application 104 may be executed by a processor of the cybersecurity computer 102, as depicted in FIG. 1, or the application 104 may be executed by a processor of a separate computing device (not shown). Application 104 is not protected. Examples of such an application include email application, web browser applications, digital wallet application, or any suitable application for which encrypted communication exchanges is desired.

In some embodiments, the cybersecurity computer 102 may be configured to operate as a service. For example, the cybersecurity computer 102 may expose one or more application programming interfaces (APIs) to be utilized by remote systems and/or devices in order to execute the functionality of the protected application 108. The cybersecurity computer 102 may process both cryptographic request messages and provide cryptographic operations response messages in TCP/IP format, HTTP format, or any suitable message format.

The cybersecurity computer 102 may be configured with a chip set 103 that initializes and manages a secure memory space 110. The secure memory space 110 may be configured by the chip set 103 to be inaccessible to any other system software or application software other than a protected application 108. The chip set 103 of the cybersecurity computer 102, perhaps as part of an initialization of the protected application 108, may be configured to initialize the secure memory space 110 for the protected application 108.

During an initialization procedure of the protected application 108, or at any suitable time, the cybersecurity computer 102 may be configured to receive a cryptographic key (e.g., from a hardware security module 112).Hardware security module 112 may include hardware and/or associated software that performs security-related operations. The security-related operations may include key generation and management. A hardware security module 112 may offer at least some degree of physical tamper-resistance and may include a user interface and/or a programmatic interface.

The hardware security module 112 may include data store 114 for storing cryptographic keys.

The cybersecurity computer 102 may be configured to transmit key requests to the hardware security module 112 at 116. Such key requests may utilize a secure communications channel such as an encrypted tunnel that transfers encrypted traffic over a network. An example of a secure communications channel may include a secure shell (SSH) tunnel that is created utilizing an SSH protocol connection. As another example, a transport layer security connection (e.g., TLS 1.2) may be utilized to provide a secure communications channel between the cybersecurity computer 102 and the hardware security module 112. The hardware security module 112 may be configured to generate a cryptographic key in response to the key requests received at 116. The cryptographic key may be stored in data store 114 and transmitted, through the secure communications channel, to the cybersecurity computer 102 at 118.

The chip set 103 of the cybersecurity computer 102 may be configured to encrypt the received cryptographic key using a device-specific key (known only to the chip set 103) in order to generate an encrypted key. The encrypted key may be stored in the secure memory space 110 and accessible to the protected application 108 for performing cryptographic operations.

Cryptographic operation request messages may be transmitted from the application 104 and received by the cybersecurity computer 102 at 120. Receipt of a cryptographic operation request may cause the cybersecurity computer 102 to execute functionality of the protected application 108. In some embodiments, the protected application 108 may be configured to perform any suitable cryptographic operation on input data. Such cryptographic operations may utilize the encrypted key stored in the secure memory space 110 managed by the chip set 103. As a non-limiting example, the protected application 108 may receive input data within a cryptographic operation request at 120. The protected application 108 may utilize the encrypted key stored in the secure memory space 110 to encrypt the input data received to generate encrypted data. The encrypted data may be provided by the protected application 108 in a cryptographic operation response message. The cybersecurity computer 102 may be configured to transmit cryptographic operation response messages to the application 104 at 122.

The various systems and/or computers depicted in FIG. 1 may be communicatively coupled by a network that may include any one or a combination of many different types of networks, such as cable networks, the Internet, wireless networks, cellular networks, and other private and/or public networks.

B. Obtaining a Cryptographic Key from an HSM

A method for obtaining a cryptographic key for performing cryptographic operations is described below with reference to FIG. 2. This method can be implemented by the cybersecurity computers described above with respect to FIG. 1, for example.

Figure 2:
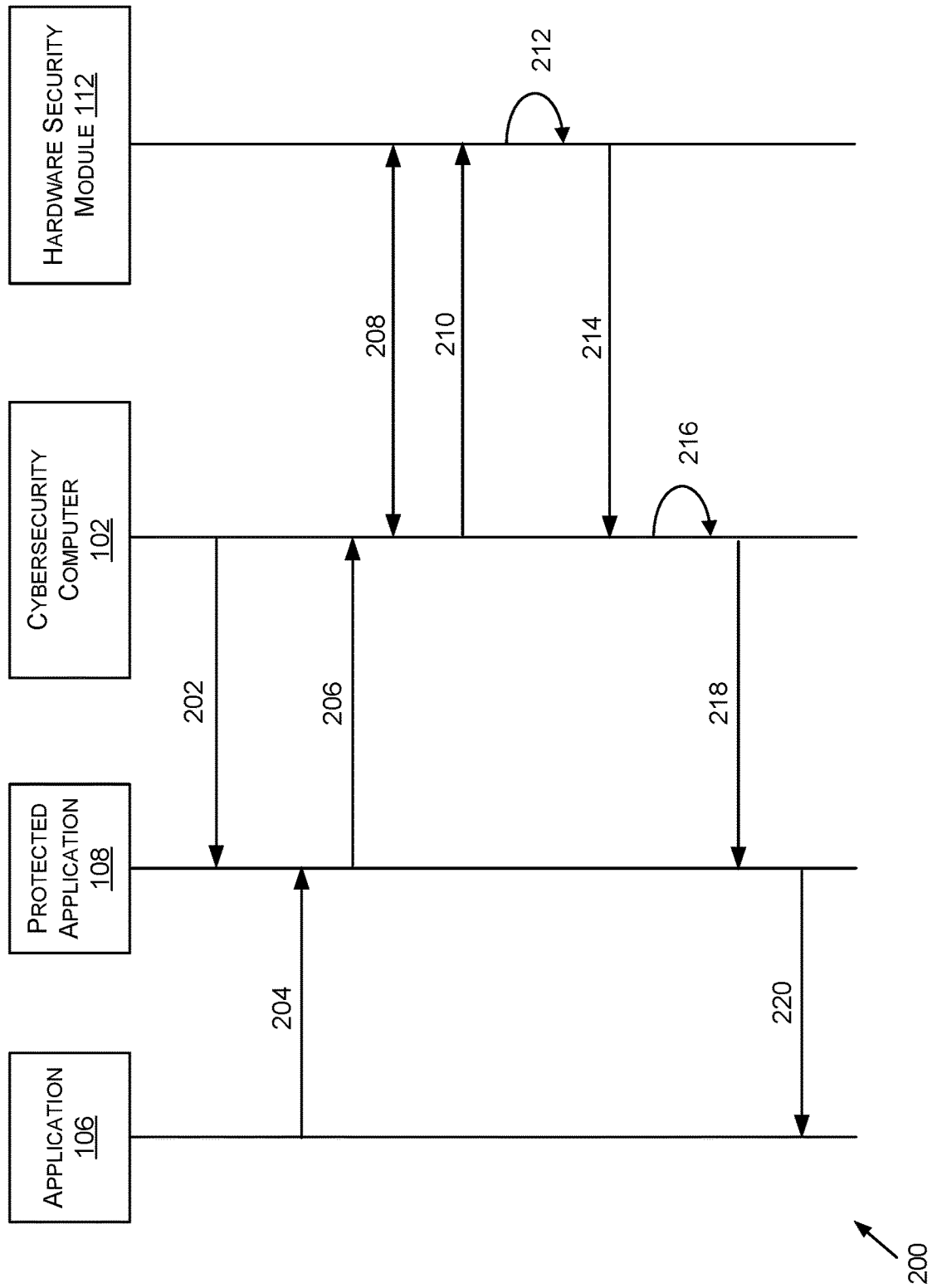
FIG. 2 is a flow diagram illustrating an example process for obtaining and utilizing a cryptographic key for performing cryptographic operations, according to some embodiments.

FIG. 2 shows a flow chart of an exemplary method 200 for obtaining a cryptographic key for performing cryptographic operations, according to some embodiments. The method can be performed by a cybersecurity computer (e.g., the cybersecurity computer 102 of FIG. 1).

At 202, the cybersecurity computer 102 initializes a protected application (e.g., the protected application 108 of FIG. 1). As part of the initialization process, a secure memory space (e.g., the secure memory space 110) may be allocated by a chip set (e.g., chip set 103) of the cybersecurity computer 102. The chip set 103 may encrypt data stored in the secure memory space utilizing a device-specific code accessible only to the chip set 103. By encrypting the data contained in the secure memory space 110, and managing access to the secure memory space 110, the chip set 103 of the cybersecurity computer 102 may protect data and processes utilizing the secure memory space from other devices and/or processes in the manner described above.

At 204, the cybersecurity computer 302 receives a cryptographic operation request message from application 106. Application 106 may be executing on the cybersecurity computer 102 or another computing device separate from the cybersecurity computer 102.

The cryptographic operation request message may include input data (e.g., text, an image, an audio file, et.) with which one or more cryptographic operations is to be performed.

At 206, the protected application 108 triggers the cybersecurity computer 102 to request a cryptographic key. In some embodiments, the protected application 108 triggers the cybersecurity computer 102 to request a cryptographic key by transmitting a key request message to the chip set 103 of the cybersecurity computer 102. The key request message may include at least an identifier (e.g., a device identifier, an alphanumeric identifier, etc.) of the requestor (e.g., the application 106).

At 208, the cybersecurity computer 102 intiates a secure communications channel (e.g., a transport layer security (TLS) tunnel) with the hardware security module 112. For example, the cybersecurity computer 102 and the HSM 112 may execute a TLS protocol handshake sequence to exchange particular cipher-suites and keys to be used to encrypt data within the channel. During this handshake, the cybersecurity computer 102 and the HSM 112 may authenticate one another based on each other's certificate (e.g., provided by a certificate authority, not shown). Once encryption mechanisms are determined, and authentication conducted, the TLS protocol used by the secure communications channel provides a message framing mechanism and signs each message with a message authentication code (MAC). The MAC algorithm is a one-way cryptographic hash function. When a TLS message is sent, a MAC value is generated and appended to the message. The receiver is then able to compute and verify the sent MAC value to ensure message integrity and authenticity. Thus, secure communications channel may be encrypted end-to-end such that data transmitted and received using the secure communications channel is readable only by the cybersecurity computer 102 and the hardware security module 112.

At 210, the cybersecurity computer 302 transmits a key request message (e.g., the key request message transmitted at 206) to the hardware security module 112 via the secure communications channel. The key request message may include at least an identifier (e.g., a device identifier, an alphanumeric identifier, etc.) of the requestor (e.g., the application 106). The key request message may be transmitted to the hardware security module 112 to obtain a cryptographic key in order to perform the cryptographic operation(s) requested by the application 106 at 204.

At 212, the hardware security module 112 obtains a cryptographic key and stores an association between the cryptographic key and the application 106 and/or the computing device executing the application 106. The hardware security module 112 may store any suitable number of cryptographic keys and is configured to manage assignments of those cryptographic keys to particular devices/applications. In this case, the hardware security module 112 may act as a key management system by assigning the cryptographic key to the application 106 (or for operations performed on behalf of the application 106) such that other systems may not utilize the same cryptographic key.

At 214, the hardware security module 112 transmits a key response message to the cybersecurity computer 102 via the secure communications channel. The key response message may include the cryptographic key assigned to the application 106. The cryptographic key may be encrypted while being transmitted over the secure communications channel and decrypted by the cybersecurity computer 102.

At 216, the cybersecurity computer 302 (e.g., the chip set 103) may store the received cryptographic key within a secure memory space (e.g., the secure memory space 110. For example, the key received at 212 may be decrypted and stored by the chip set 103 of the cybersecurity computer 102 in a secure memory space (e.g., the secure memory space 110) utilizing a device-specific key known only to the chip set 103. As stored, the key may be encrypted by the chip set 103 such that only the chip set 103 may access the key.

At 218, the cybersecurity computer 102 triggers the protected application 108 to perform the one or more cryptographic operations (e.g., encryption, decryption, hashing, etc.) requested at 204 utilizing the encrypted cryptographic key contained within the secure memory space. For example, the cryptographic operation request message received at 204 may request that the input data provided in the message be encrypted. Accordingly, the protected application 108 may encrypt the input data provided at 204 utilizing the cryptographic key stored in the secure memory space 110 and managed by the chip set 103.

At 220, the resultant data (e.g., the encrypted version of the input data) may then be transmitted to the application 106 via a cryptographic operation response message. Upon receipt, the application 106 may utilize the encrypted data for a message transmission to another device, or for any suitable purpose.

C. Initialization Using Key Custodian

Figure 3:
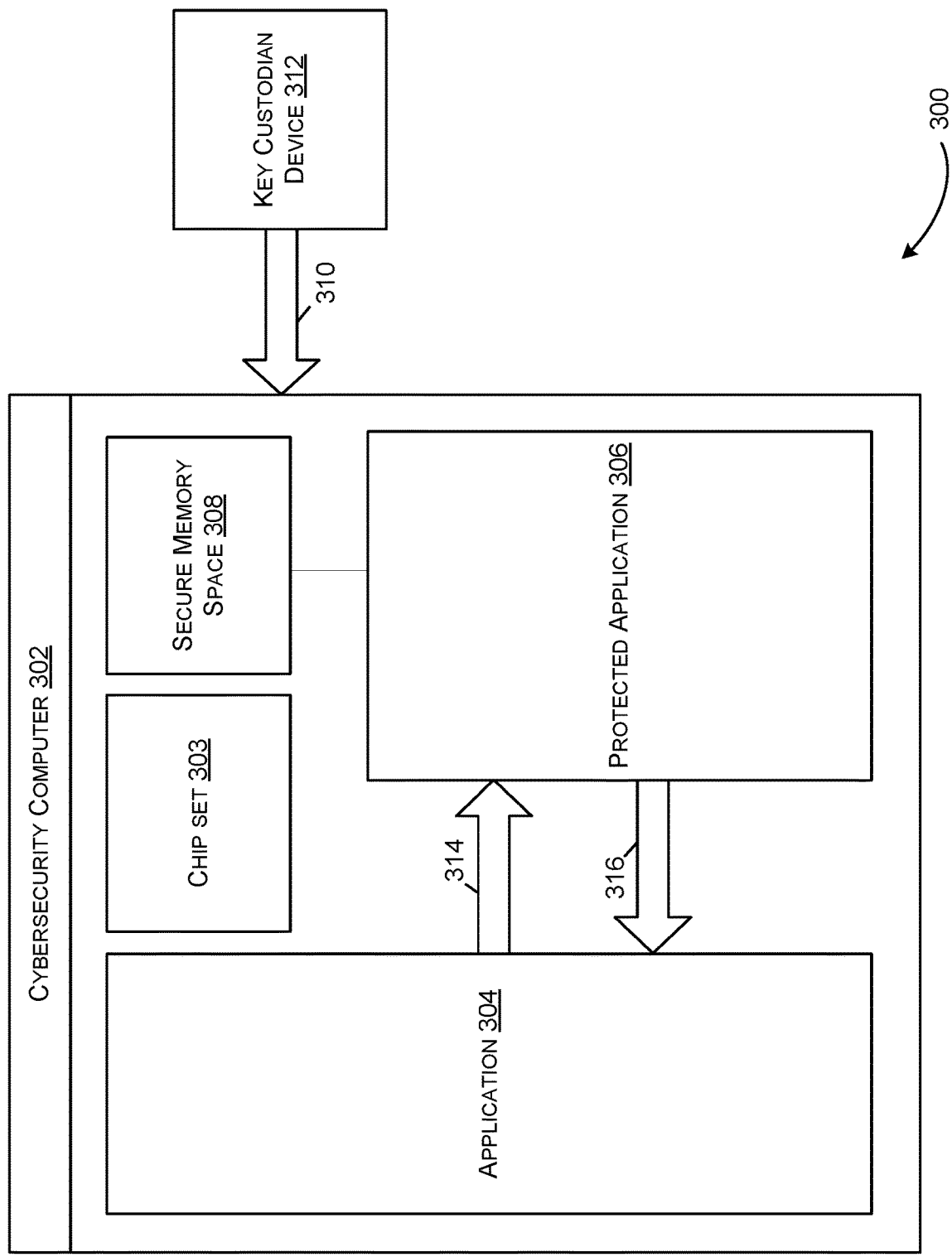
FIG. 3 is a block diagram of a system for obtaining a cryptographic key, according to some embodiments.

FIG. 3 is a block diagram of a system 300 for obtaining a cryptographic key for performing cryptographic operations, according to some embodiments. The cybersecurity computer 202 may be an example of the cybersecurity computer 102 of FIG. 1. The application 204 may be an example of the application 104 of FIG. 1. The application 204 may be executed by a processor of the cybersecurity computer 202, as depicted in FIG. 2, or the application 204 may be executed by a separate computing device (not shown).

The cybersecurity computer 302 (e.g., the cybersecurity computer 102 of FIG. 1) may be configured to operate as a service. For example, the cybersecurity computer 302, operating as a service, may expose one or more application programming interfaces (APIs) to be utilized by remote systems and/or devices in order to stimulate the functionality of the protected application 306. The cybersecurity computer 302 may both process cryptographic operations request messages and provide cryptographic operations response messages in TCP/IP format, HTTP format, or any suitable message format.

The cybersecurity computer 302 may be configured with a chip set 303 that is configured to initialize and manage a secure memory space 308. The secure memory space 308 may be configured by the chip set 303 to be inaccessible to any other system software or application software other than the protected application 306. The chip set 303 of the cybersecurity computer 302, perhaps as part of an initialization of the protected application 306, may be configured initialize a secure memory space 308 for the protected application 306.

During an initialization procedure of the protected application 306, or at any suitable time, the cybersecurity computer 302 may be configured to receive a cryptographic key at 310. For example, a trusted party (e.g., a key custodian responsible for maintaining cryptographic keys) may operate a key custodian device 312. The key custodian device 312 may be any suitable computing device (e.g., mainframes, desktop or laptop computers, tablets, mobile devices, etc.). The cybersecurity computer 302 may be configured to expose one or more application programming interfaces (APIs) that may be utilized by the key custodian device 312 to provide the cryptographic key at 310. Although not depicted, the cybersecurity computer 302 may additionally, or alternatively, provide one or more user interfaces that may be utilized by the key custodian to provide a cryptographic key via the cybersecurity computer 302.

Upon receipt of the cryptographic key, the chip set 303 of the cybersecurity computer 302 may be configured to encrypt the received cryptographic key using a device-specific key (known only to the chip set 303) in order to generate an encrypted key. The chip set may execute instructions to store encrypted key in the secure memory space 308 maintained by the chip set. The chip set 303 may enforce access control to the encrypted key such that the encrypted key is accessible only to the protected application 306.

In some embodiments, cryptographic operation request messages may be transmitted from the application 304 and received by the cybersecurity computer 302 at 314. Receipt of a cryptographic operation request may cause the cybersecurity computer 302 to trigger execution of the functionality of the protected application 306. As discussed above, the protected application 306 may be configured to perform any suitable cryptographic operation on input data. The cybersecurity computer 302 may be configured to transmit cryptographic operation response messages at 316 in response to the cryptographic operation request messages received at 314.

The various systems and/or computers depicted in FIG. 3 may be communicatively coupled by a network that may include any one or a combination of many different types of networks, such as cable networks, the Internet, wireless networks, cellular networks, and other private and/or public networks.

D. Obtaining a Cryptographic Key from a Trusted Key Custodian

A method for obtaining a cryptographic key for performing cryptographic operations is described below with reference to FIG. 4. This method can be implemented by the cybersecurity computers described above with respect to FIG. 2, for example.

Figure 4:
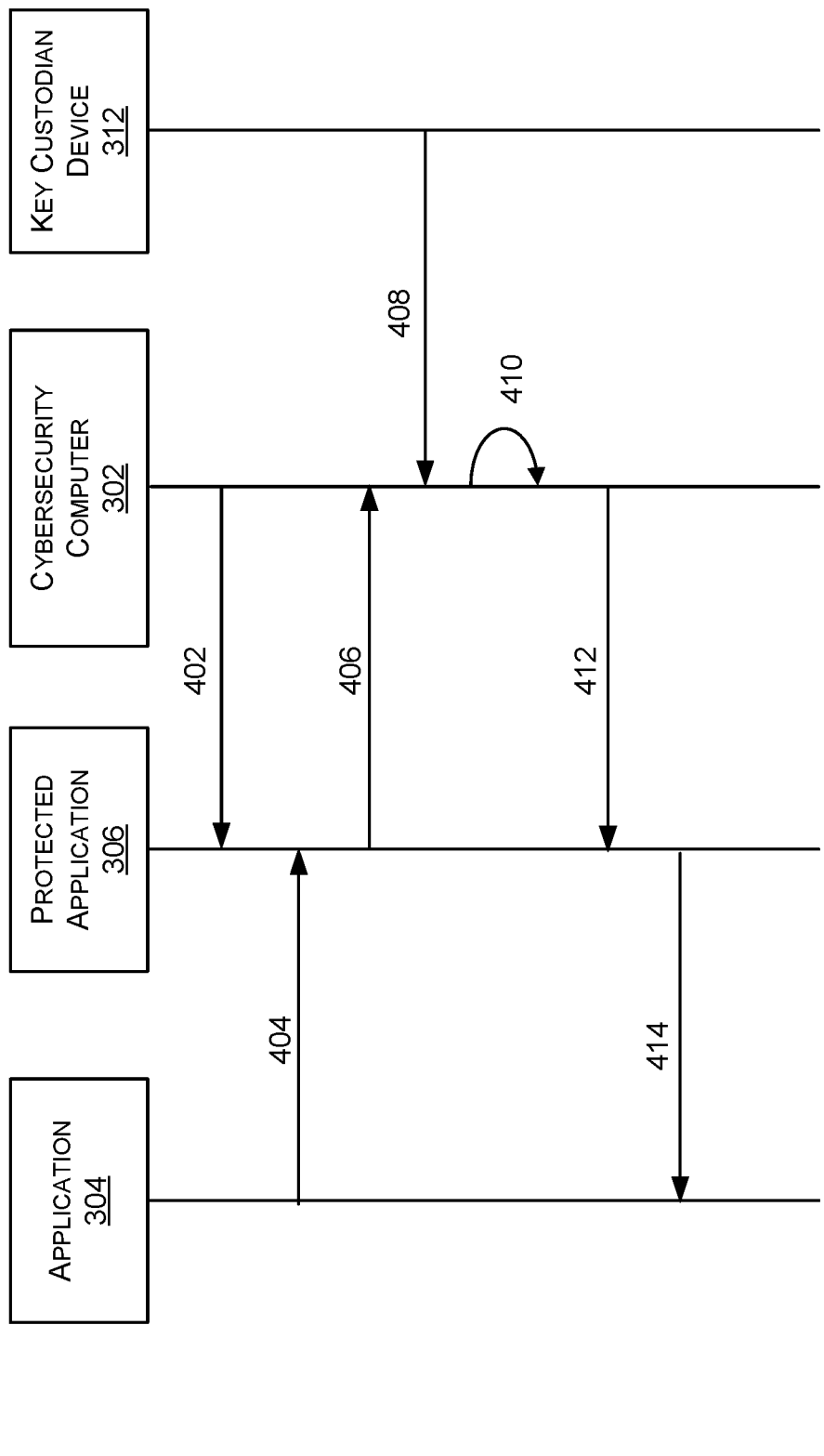
FIG. 4 is a flow diagram illustrating another example process for obtaining and utilizing a cryptographic key for performing cryptographic operations, according to some embodiments.

FIG. 4 shows a flow chart of an exemplary method 400 for obtaining a cryptographic key for performing cryptographic operations, according to some embodiments. The method 400 can be performed by a cybersecurity computer 302 of FIG. 3.

At 402, the cybersecurity computer 302 initializes the protected application 306 of FIG. 3. As part of the initialization process, a secure memory space (e.g., the secure memory space 308) may be allocated by a chip set 303 of the cybersecurity computer 302. The chip set 303 may encrypt the secure memory space utilizing a device-specific code (e.g., a private key) accessible only to the chip set 303. By encrypting and managing access to the secure memory space, the chip set 303 of the cybersecurity computer 302 may protect data and processes utilizing the secure memory space from other devices and/or processes in the manner described above.

At 404, the cybersecurity computer 502 receives a cryptographic operation request message from application 304. Application 304 may be executing on the cybersecurity computer 302 or another computing device separate from the cybersecurity computer 302. The cryptographic operation request message may include input data (e.g., text, an image, an audio file, et.) with which one or more cryptographic operations is to be performed. The cryptographic operation request message may further indicate what cryptographic operations (e.g., encryption, decryption, hashing, message authentication code generation, etc.) are to be performed on the input data. In some embodiments, the cryptographic operation request message may include an indication as to what particular cryptographic algorithm (e.g., Triple DES, RSA, Blowfish, Twofish, AES, HMAC, SHA-1, etc.) is to be used to perform the cryptographic operations.

At 406, the protected application 306 triggers the cybersecurity computer 302 to request a key from a key custodian (e.g., via the key custodian device 312). For example, the protected application 306 may transmit a key request message to the cybersecurity computer 302 at 406. The key request message may include at least an identifier (e.g., a device identifier, an alphanumeric identifier, etc.) of the requestor (e.g., the application 304).

At 408, the cybersecurity computer 302 receives a key from a key custodian device 312 (e.g., a device operated by a trusted operator). In some embodiments, the key custodian may input the key via a user interface provided by the cybersecurity computer 302 (not shown). Alternatively, the key custodian may utilize the key custodian device 312 to provide the key to the cybersecurity computer 302 (e.g., via a user interface provided to the key custodian device 312 by the cybersecurity computer 302, via an application programming interface, etc.). In some embodiments, the key may be provided as clear text as a one-time initialization task associated with the protected application 306. In still further embodiments, the key custodian may be prompted (e.g., via an electronic message, a user interface provided on the key custodian device 312, or any suitable means) by the cybersecurity computer 302 after the cybersecurity computer 302 has been triggered at 406. By way of example, the cybersecurity computer 302 may forward the key request message received at 406 to the key custodian device 312 to prompt the key custodian to provide a key for the requestor (e.g., the application 304).

At 410, the chip set 303 of the cybersecurity computer 302 stores the received cryptographic key within a secure memory space (e.g., the secure memory space 308 of FIG. 3) managed by the chip set 303. For example, the key received at 408 may be encrypted by the chip set 303 utilizing a device-specific key known only to the chip set 303. Once encrypted, the encrypted key may be stored by the chip set 303 of the cybersecurity computer 302 in a secure memory space 308. As stored, the key may be accessed only by the chip set 303 utilizing the device-specific key known only to the chip set 303.

At 412, the cybersecurity computer 302 triggers the protected application 306 to perform the one or more cryptographic operations (e.g., encryption, decryption, hashing, etc.) requested at 404 utilizing the encrypted cryptographic key contained within the secure memory space. For example, the cryptographic operation request message received at 404 may request that the input data provided in the message be encrypted. Accordingly, the protected application 306 may encrypt the input data provided at 404 utilizing the cryptographic key stored in the secure memory space 308 and managed by the chip set 303.

At 414, the resultant data (e.g., the encrypted version of the input data) may then be transmitted to the application 304 via a cryptographic operation response message. Upon receipt, the application 304 may utilize the encrypted data for a message transmission to another device, or for any suitable purpose.

II. Architecture of a Cybersecurity Computer

Figure 5:
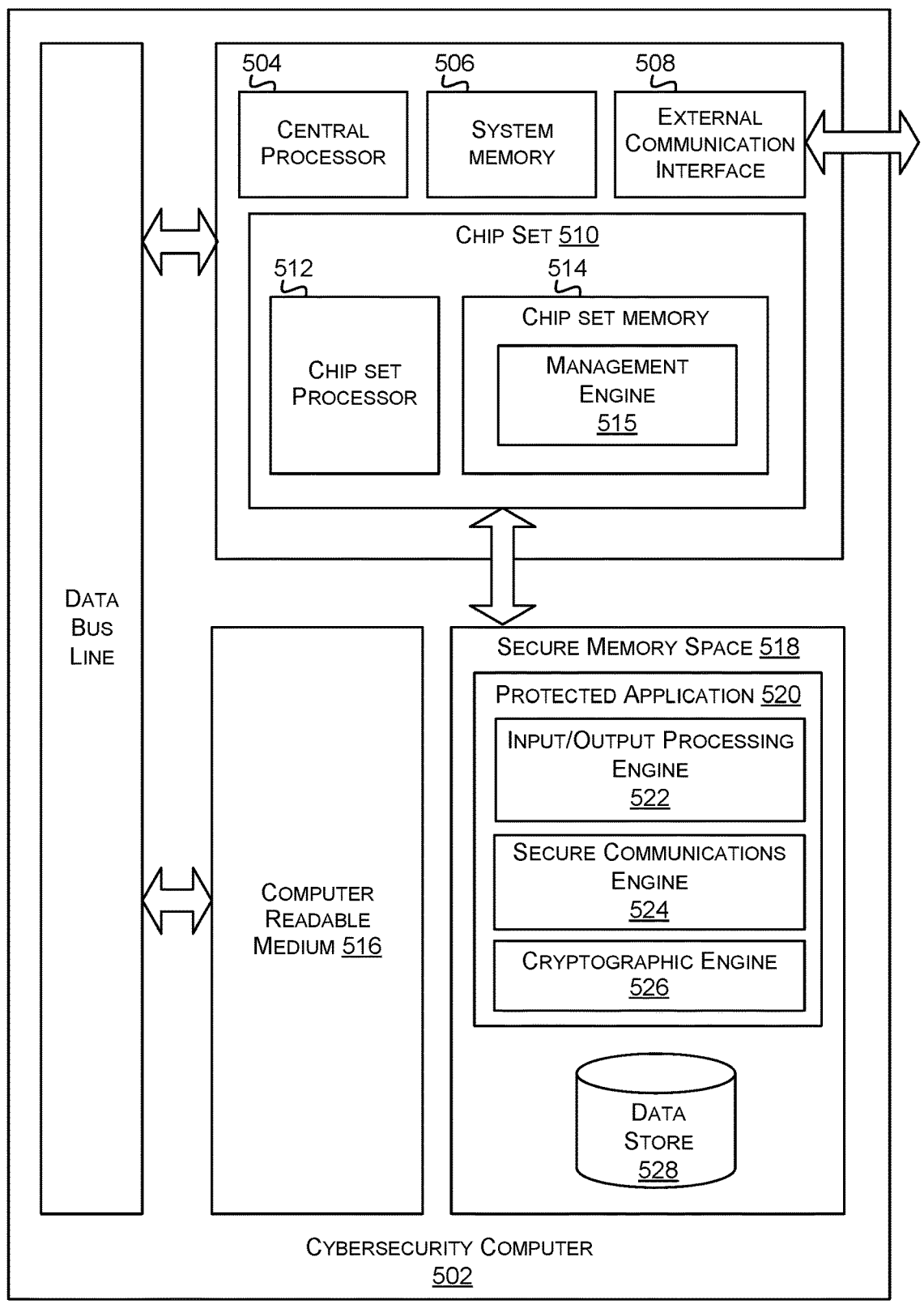
FIG. 5 is an example computer architecture capable of a cybersecurity computer, according to some embodiments.

FIG. 5 is an example computer architecture 500 of a cybersecurity computer 502 (e.g., the cybersecurity computer 102 of FIG. 1 or the cybersecurity computer 302 of FIG. 3), according to some embodiments. The cybersecurity computer 502 may include a central processor 504. The processor 504 may be coupled to a system memory 506 and an external communication interface 508. The cybersecurity computer 502 may include chip set 510. The chip set 510 may include a chip set processor 512 that may be coupled with chip set memory 514. The chip set memory 514 may be configured to store chip set instructions (e.g., firmware or configuration logic for an FPGA) for performing functionality described herein with respect to chip set operations.

Chip set memory 514 may include instructions for management engine 515. Management engine 515 may comprise code, executable by the chip set processor 512, for initializing and managing one or more secure memory spaces, such as secure memory space 518. The management engine 515 may be configured to enforce access control protocols to restrict access to the secure memory space 518. Utilizing the access control protocols, the management engine 515 may restrict access to the secure memory space 518 such that only an application (e.g., the protected application 108 of FIG. 1, the protected application 306 of FIG. 3, etc.) associated with the secure memory space 518 may access content (e.g., the data store 528) within the secure memory space 518.

A computer readable medium 516 may also be operatively coupled to the processor 504. The computer readable medium 516 may comprise software that is executable by the processor 504.

The secure memory space 518 may be operatively coupled to the chip set processor 512, and the secure memory space 518 may include the protected application 520. Protected application 520 may comprise code, executable by the chip set processor 512, for performing the functionality described herein. The protected application 520 may include an input/output processing engine 522, a secure communications engine 524, and a cryptographic engine 526, although any suitable number of modules or engines may be utilized to perform the functionality described herein in connection with the protected application 520.

The data store 528 may be implemented using various data structures, such as an array, hash map, (linked) list, structured text file (e.g., XML), table, and/or the like. Such data structures may be stored in memory and/or in structured files. The data store 528 may be configured to reside within the secure memory space 518 by the management engine 515. Access to the data store 528 may be performed according to access control protocols associated with the management engine 515. In some embodiments, the data store 528 may be configured to store encrypted data such as an encrypted version of a cryptographic key. By way of example, the data store 528 may be configured to store cryptographic keys initially obtained from one or more key custodians. The management engine 515 may enforce access control to the data store 528 such that content of the data store 528 is accessible by the chip set processor 512 via execution of function calls of the protected application 520, and inaccessible by any other means.

III. Functionality of Chip Set and Secure Memory

The cybersecurity computer 502 may include various engines that collectively perform operations to obtain and utilize cryptographic keys for performing cryptographic operations. The engines may include a management engine, an input/output processing engine, a secure communications engine, and a cryptographic engine.

A. Management Engine

The management engine 515 can create and manage secure memory spaces. As processor 504 initially loads code and data of the protected application 520, the processor 504 may transmit a secure memory space request to the chip set processor 512. Upon receipt, the chip set processor 512 can execute instructions of the management engine 515 to initialize and configure the secure memory space 518.

In some embodiments, the management engine 515 may cause the chip set processor 512 to copy code and data of the protected application 520 from unprotected memory (e.g., the computer readable medium 516) into the secure memory space 518. The management engine 315 can then cause the processor 512 to encrypt (e.g., cryptographically hash) the contents of the secure memory space 518 using an encryption key stored in chip set memory 514. In some embodiments, the encryption key may be hard-coded into the chip set memory 514. The encryption ensures that the code and data stored in the secure memory space 518 cannot be accessed by other software, including system software, or other devices. In some embodiments, the management engine 515 can support multiple secure memory spaces at a time.

B. Input/Output Processing Engine

The input/output processing engine 522 can be configured to receive encryption key(s) from one or more key custodians (e.g., via a key custodian device 312 of FIG. 3 for example). In cases where the encryption key is encrypted, the input/output processing engine 522 may forward the key to the secure communications engine 524. Upon receipt the secure communications engine 524 may forward the encrypted key to a HSM (e.g., the HSM 112 of FIGS. 1 and 2) via a secure communication channel in order for the HSM to decrypt the encryption key. The decrypted key may be provided by the HSM and received by the secure communications engine 524 and stored within the data store 528. The input/output processing engine 522 can receive and process cryptographic operation request messages. A cryptographic operation request message may include input data for which a cryptographic operation is requested. A cryptographic operation request message may further include a cryptographic operation indicator (or other data field) that identifies a type of cryptographic operations to be performed. Some cryptographic operations may include encryption, decryption, hashing, MAC calculations, and validation of hashes and/or MACs.

The input/output processing engine 522 can trigger execution of the secure communications engine 524 and/or the cryptographic engine 526. By way of example, the input/output processing engine 522 can determine that a cryptographic key has not been obtained for the requesting device. Accordingly, the input/output processing engine 522 can trigger execution of code associated with the secure communications engine 324 discussed further below. In at least one embodiment, the input/output processing engine 522 can request a cryptographic key from a key management system (e.g., an HSM). Once a cryptographic key has been obtained for the requesting device, the input/output processing engine 522 can trigger the execution of code associated with the cryptographic engine 526 to perform one or more of the cryptographic operations requested. In some cases, the input/output processing engine 522 can forward at least a portion of the cryptographic operations request message and/or the obtained cryptographic key to the cryptographic engine 526 to perform the one or more of the cryptographic operations requested.

The input/output processing engine 522 can generate and transmit cryptographic operation response messages. A cryptographic operation response message may include resultant data provided by the cryptographic engine 526. The resultant data may be generated by the cryptographic engine 526 by executing one or more cryptographic operations on input data received via a cryptographic operation request message.

C. Secure Communications Engine

The secure communications engine 524 may initiate a secure communications channel (e.g., a transport layer security (TLS) tunnel) with a remote device (e.g., an HSM), where the channel is encrypted end-to-end. The secure communications channel may be utilized to provide key request messages and receive key response messages between the cybersecurity computer 302 and the remote device.

The secure communications engine 524 may receive an encrypted key (e.g., from a key custodian via the key custodian device 312 of FIG. 3). The secure communication engine 524 may forward the encrypted key via the secure communications channel to the remote device (e.g., the HSM) for decryption. Upon receiving a decrypted key from the remote device, the secure communications engine 524 may store the decrypted key within data store 528. Thus, the key may be decrypted with respect to modules and executing within the secure memory space 518 but encrypted (e.g., using a device-specific key managed by the chip set 510) with respect to applications and/or systems external to the secure memory space 518.

The secure communications engine 524 may transmit key request messages (e.g., as part of an initialization process of the protected application 520, in response to a cryptographic operation request message, etc.). The key request message may be transmitted via the secure communications channel managed by the secure communications engine 524. A key request message can include at least an identifier (e.g., a device identifier, an alphanumeric identifier, etc.) of the requestor (e.g., the application 104 of FIG. 1). A key request message can be transmitted to a hardware security module (e.g., the hardware security module 112 of FIG. 1) via the secure communications channel. If transmitted via the secure communications channel, the key request message may be encrypted by the secure communications engine 524 using a session key for the secure communications channel and decrypted by the hardware security module using the same session key. In some embodiments, the key request message may be transmitted to a key custodian device (e.g., the key custodian device 312 of FIG. 3). In some embodiments, the secure communications engine 524 can provide a user interface for requesting key input (e.g., from a key custodian) for example, as part of an initialization process of the protected application 520.

The secure communications engine 524 may receive key response messages. A key response message may include at least a cryptographic key provided by a key management entity (e.g., the hardware security module 112 or the key custodian device 312). If received from a hardware security module, the key response message may be encrypted using a session key of a secure communications channel and decrypted by the secure communications engine 524 upon receipt. The secure communications engine 524 can trigger the chip set processor 512 to store the cryptographic key in data store 528 within the secure memory space 518. The chip set processor 512 may encrypt the cryptographic key with a device-specific key stored in chip set memory 514. Once encrypted, a decrypted version of the cryptographic key may be obtainable only by the chip set processor 512 utilizing the device-specific key stored in the chip set memory 514.

D. Cryptographic Engine

The cryptographic engine 526 can perform one or more cryptographic operations on received input data. In some embodiments, the content of a cryptographic operation request message may be received by the cryptographic engine 526 via the input/output processing engine 522. Upon receipt, the cryptographic engine 526 may determine one or more cryptographic operations requested. In some examples, the cryptographic operations requested may be indicated utilizing an indicator or other suitable data field within the cryptographic operation request message.

The cryptographic engine 526 may generate resultant data by performing the requested cryptographic operation(s) on the received input data. By way of example, a cryptographic operation request message may include input text and an indicator specifying that the input text is to be cryptographically hashed utilizing a particular hashing algorithm. The cryptographic engine 526 can access the cryptographic key stored in the data store 528 and managed by the chip set 510 by executing a function call to the chip set processor 512. The cryptographic engine 526 can utilize the specified hashing algorithm and the cryptographic key to hash the received input text. The resultant data (e.g., the hashed text) may be provided by the cryptographic engine 526 in a cryptographic operation response message. In some embodiments, if the cryptographic engine 526 is unable to perform the requested cryptographic operation(s), a cryptographic operation response message may include an indicator specifying the reason(s) for which performance of the cryptographic operation was unsuccessful.

IV. Methods for Obtaining and Utilizing Cryptographic Keys

A method for performing a secure cryptographic operation is described below with reference to FIG. 6. This method can be implemented by the cybersecurity computers described above with respect to FIGS. 1, 2, and 3, for example.

Figure 6:
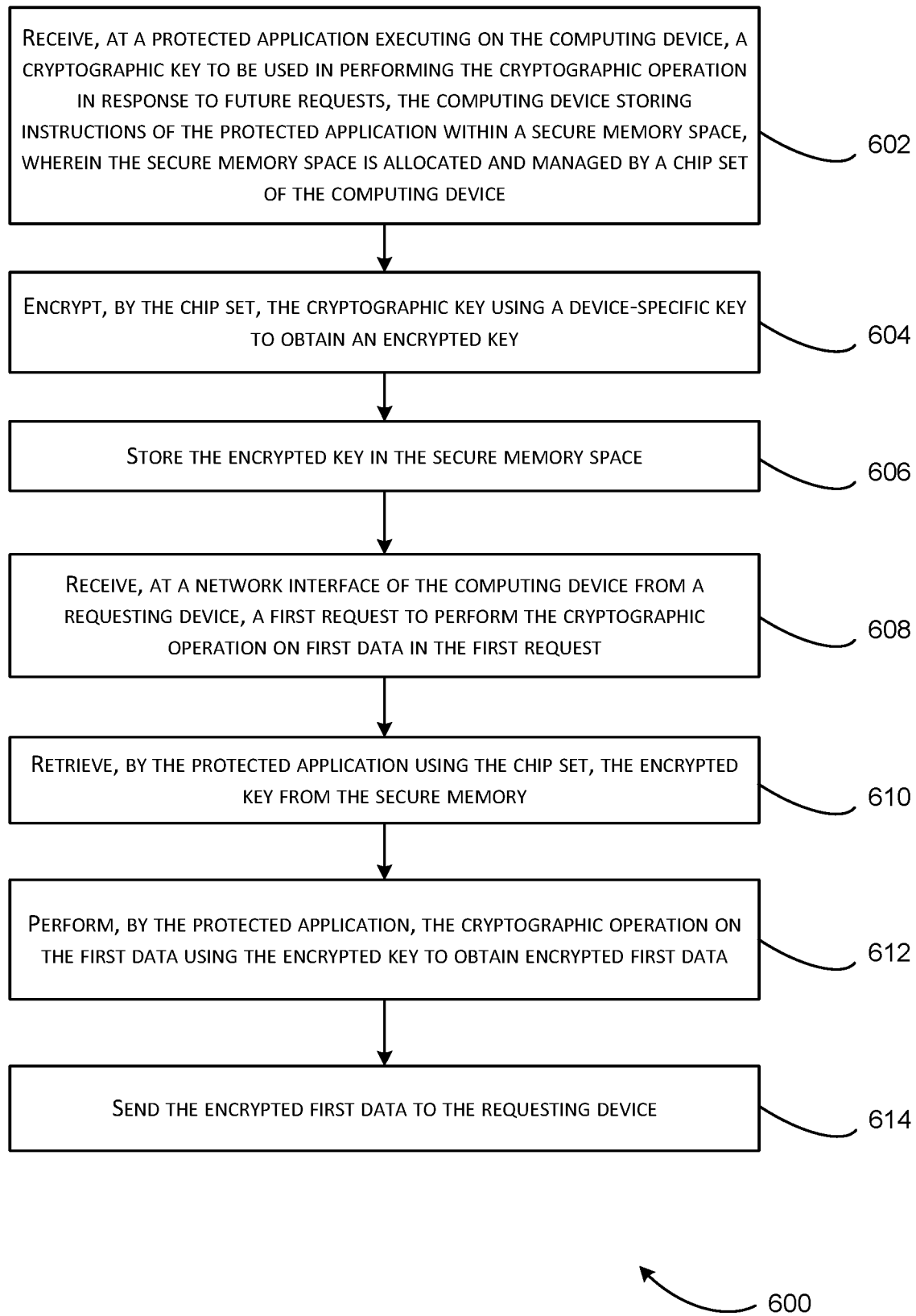
FIG. 6 shows a flow chart of an exemplary method for performing a secure cryptographic operation, in accordance with some embodiments.

FIG. 6 shows a flow chart of an exemplary method 600 for performing a secure cryptographic operation, in accordance with some embodiments. The method 600 can be performed by a cybersecurity computer described above in connection with FIGS. 1-5.

At 602, a cryptographic key may be received (e.g., by the secure communications engine 524 of FIG. 5) at a protected application (e.g., the protected application 520). The cryptographic key may be used to perform one or more cryptographic operations in response to future requests (e.g., cryptographic operation request messages). The protected application may be executing on a computing device that stored instructions of the protected application within a secure memory space (e.g., the secure memory space 518 of FIG. 5). The secure memory space may be allocated and managed by a chip set of the computing device (e.g., the chip set 510 of FIG. 5).

At 604, the cryptographic key received at 602 may be encrypted by the chip set (e.g., the chip set 510 utilizing the management engine 515). In some embodiments, the cryptographic key may be encrypted using a device-specific key to obtain an encrypted key. The device-specific key may be hard coded on the chip set (e.g., within chip set memory 514) and accessible only to components of the chip set (e.g., the chip set processor 512). The chip set can store the encrypted key in the secure memory space at 606.

At 608, a first request (e.g., a cryptographic request message) to perform the cryptographic operation on first data (e.g., input data) in the first request may be received (e.g., by the input/output processing engine 522 of FIG. 5). The first request may be received at a network interface of the computing device from a requesting device. For example, the first request may indicate that encryption is to be performed on the first data (e.g., email message text). As another example, the first request may indicate that decryption is to be performed on the first data (e.g., previously encrypted data such as encrypted email message text). As yet another example, the first request may indicate that the input data is to be hashed or that a MAC code is to be generated for the input data.

At 610, the encrypted key may be retrieved (e.g., by the cryptographic engine 526 of FIG. 5) from the secure memory space by the protected application using the chip set. For example, the protected application 520 of FIG. 5 can execute a function call to the chip set processor 512 that requests access to a cryptographic key stored in the secure memory space 518. The cryptographic key may be retrieved and decrypted by the chip set processor 512. The decryption may use a device-specific key stored in chip set memory 514 of FIG. 5 that is accessible only to the chip set processor 512.

At 612, the cryptographic operation may be performed on the first data by the protected application (e.g., the cryptographic engine 526). The cryptographic operation performed corresponds to the cryptographic operation requested at 608 in the first request. As discussed above, the cryptographic operation performed may be encryption, decryption, hashing, calculating a message authentication code, or any suitable cryptographic function. Thus, the input data received at 608 may be encrypted or decrypted according to the first request received at 608. In some embodiments, the input data may be hashed according to the first request received at 608. In still further embodiments, the input data may be used to generate a message authentication code for the input data received at 608. The encrypted/decrypted/hashed data or the message authentication code may be returned to the requesting device.

At 614, the encrypted first data (or other data resulting from the particular cryptographic operation such as decrypted data, hashed data, or message authentication code, depending on the example) may be sent to the requesting device (e.g., by the input/output processing engine 522). In some embodiments, the encrypted first data is sent (e.g., by the cryptographic engine 526) via a cryptographic response message. Once received, the requesting device may utilize the data provided via the cryptographic response message (e.g., the encrypted data) to transmit a message to another device, or for any suitable purpose.

Figure 7:
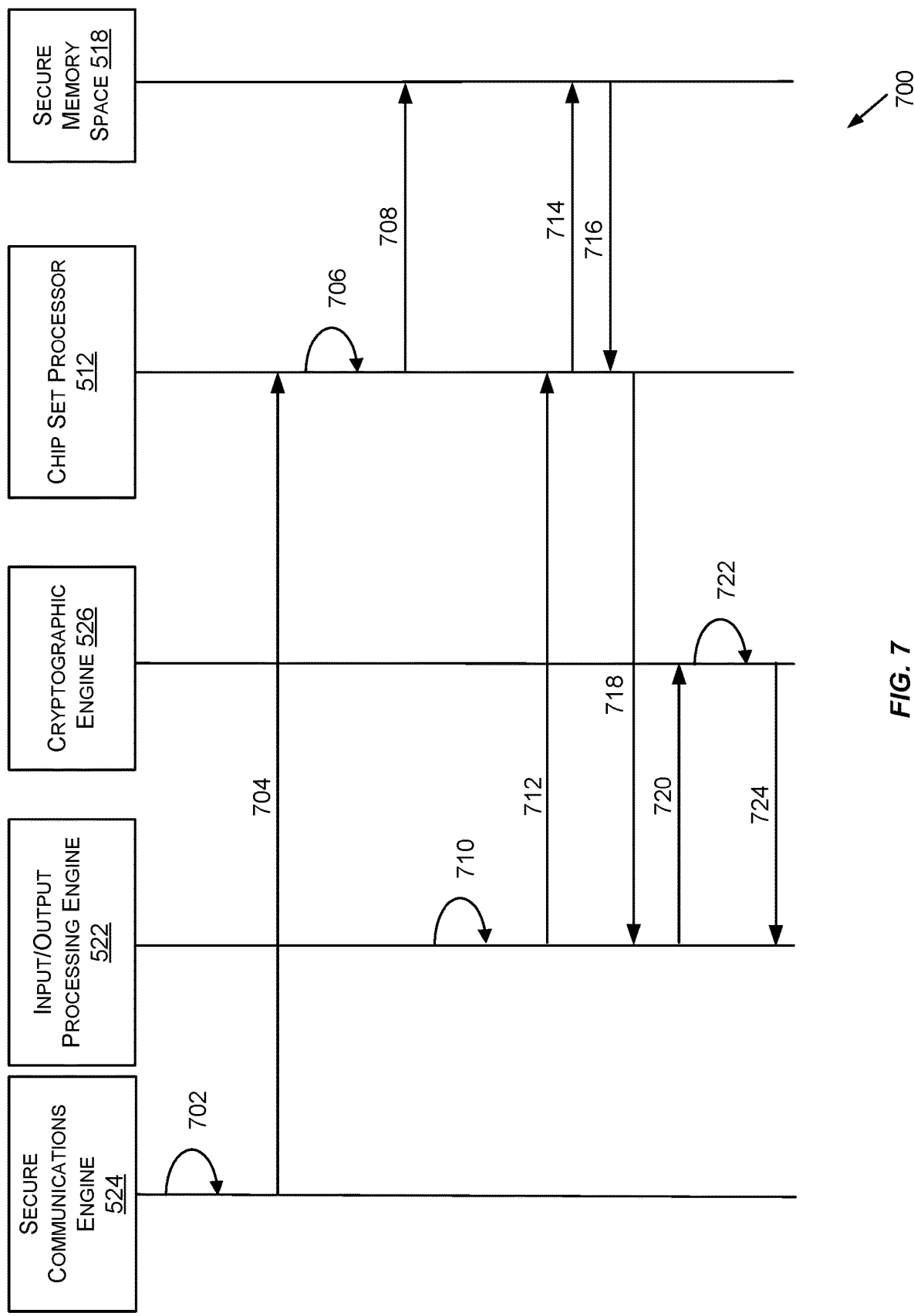
FIG. 7 shows a flow chart of an exemplary method for storing and accessing a cryptographic key for performing cryptographic operations, according to some embodiments.

FIG. 7 shows a flow chart of an exemplary method 700 for storing and accessing a cryptographic key for performing cryptographic operations, according to some embodiments. The method 700 may begin at 702, where a cryptographic key may be received by the secure communications engine 524 at a protected application (e.g., the protected application 520). The cryptographic key may be used to perform one or more cryptographic operations in response to future requests (e.g., cryptographic operation request messages). The protected application may be executing on a computing device that stored instructions of the protected application within a secure memory space (e.g., the secure memory space 518 of FIG. 5). The secure memory space may be allocated and managed by a chip set of the computing device (e.g., the chip set 510 of FIG. 5). In some embodiments, the cryptographic key may be received from a HSM or a key custodian device as described above.

At 704, the secure communications engine 524 executes a function call to provide the cryptographic key to the chip set processor 512. The function call may include the cryptographic key and an identifier associated with the protected application such as an alphanumeric identifier that is unique to the protected application.

At 706, the cryptographic key is encrypted by the chip set processor 512 using a device-specific key (e.g., a device-specific key stored in the chip set memory 514) to obtain an encrypted key. The device-specific key may have been hard-coded in the chip set memory 514 during a manufacturing process of the chip set 510. The device-specific key may be accessible only to components of the chip set (e.g., the chip set processor 512).

At 708, the encrypted version of the cryptographic key is stored in the secure memory space 518. For example, the encrypted version of the cryptographic key may be stored as an association with the protected application 520. The secure memory space 518 may be managed by the chip set 510 such that only the chip set processor 512 may access the data stored within the secure memory space 518. Other processes running on the cybersecurity computer 502 may not access the key without utilizing the chip set 510. Because the chip set 510 manages an association between the protected application 520 and the encrypted key, the chip set may restrict access to the encrypted key to only function calls performed by the protected application 520.

At 710, a first request (e.g., a cryptographic request message) to perform the cryptographic operation on first data (e.g., input data) in the first request is received by the input/output processing engine 522. The first request may be received at a network interface of the computing device from a requesting device. For example, the first request may indicate that encryption is to be performed on the first data (e.g., email message text). As another example, the first request may indicate that decryption is to be performed on the first data (e.g., previously encrypted data such as encrypted email message text). As yet another example, the first request may indicate that the input data is to be hashed or that a MAC code is to be generated for the input data.

At 712, the input/output processing engine 522 executes a function call to the chip set processor 512 to request access to the cryptographic key. The function call may include an alphanumeric identifier for the requesting device. In alternate embodiments, this function call may be performed by the cryptographic engine 526 after the cryptographic operations request is forwarded to the cryptographic engine 526 from the input/output processing engine 522.

At 714, the chip set processor 512 requests the cryptographic key from the secure memory space 518. The request may indicate the alphanumeric identifier of the requesting device. In some embodiments, the cryptographic key may be stored in the data store 528 within the secure memory space 518. In these instances, the chip set processor 512 may query the data store 528 in order to obtain the cryptographic keyThe cryptographic key may remain in an encrypted state (e.g., encrypted by the device-specific key of the cybersecurity computer 502).

At 716, the encrypted key is returned by the to the chip set processor 512. The chip set processor 512 may utilize the device-specific key stored in the chip set memory 514 to decrypt the key.

At 720, the decrypted key is provided to the input/output processing engine 522 by the chip set processor 512. The decrypted key is provided in response to the function call executed at 712.

At 720, the input/output processing engine 522 forwards the first request to the cryptographic engine 526. In some cases, the input/output processing engine 522 forwards the cryptographic key received at 718. If the operations at steps 712-718 failed to provide a cryptographic key, or in embodiments in which the first request alone is forwarded without a cryptographic key, the cryptographic engine 526 may determine that performance of the first request requires a cryptographic key (e.g., the cryptographic key stored in the data store 528). As a non-limiting example, the cryptographic engine 526 may maintain a mapping between particular cryptographic operations and associated cryptographic algorithms/functions. The first request may include an enumeration field, where a value of the field corresponds to a particular cryptographic operation. The cryptographic engine 526 may use the value of the field to perform a lookup within the mapping to identify a particular cryptographic algorithm/function. For example, a value of "2" in the enumeration field may be extracted from the first request message. The value of "2" may be mapped to a Triple DES encryption algorithm. Accordingly, the cryptographic engine 526 may identify the particular cryptographic operation to perform from the first request in the manner described above. If a cryptographic key has not already been obtained and forwarded to the cryptographic engine 526, the cryptographic engine 526 may perform a similar function call as described at 712 in order to obtain a cryptographic key stored within the secure memory space 518.

At 722, the cryptographic engine 526 utilizes the decrypted key to perform the cryptographic operations requested at 710 in the first request. As discussed above, the cryptographic operation performed may be encryption, decryption, hashing, calculating a message authentication code, or any suitable cryptographic function. Thus, the input data received at 710 may be encrypted or decrypted according to the first request. In some embodiments, the input data may be hashed according to the first request received at 710. In still further embodiments, the input data may be used to generate a message authentication code for the input data received at 710.

At 724, the encrypted first data (or other data resulting from the particular cryptographic operation such as decrypted data, hashed data, or message authentication code, depending on the example) is sent to the input/output processing engine 522. Once received, the input/output processing engine 522 transmits the encrypted first data to the requesting device. Alternatively, the encrypted first data can be sent directly to the requesting device by the cryptographic engine 526. In either scenario, the encrypted first data (or other data resulting from the particular cryptographic operation) is transmitted to the requesting device via a cryptographic response message. Once received, the requesting device may utilize the data provided via the cryptographic response message (e.g., the encrypted data) to transmit a message to another device, or for any suitable purpose.

V. Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems may be interconnected via a system bus. Additional subsystems such as a printer, a keyboard, one or more storage device(s), a monitor, which is coupled to a display adapter, and others may be utilized. Peripherals and input/output (I/O) devices, which couple to I/O controller, can be connected to the computer system by any number of means known in the art such as input/output (I/O) port (e.g., USB, FireWire). For example, I/O port or external interface (e.g. Ethernet, Wi-Fi, etc.) can be used to connect a computer system to a wide area network such as the Internet, a mouse input device, or a scanner. The interconnection via system bus may allow the central processor to communicate with each subsystem and to control the execution of instructions from system memory or storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors that can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A computer-implemented method for performing a cryptographic operation by a computing device, the method comprising:
    receiving, at a protected application executing on the computing device from a trusted key custodian, a cryptographic key to be used in performing the cryptographic operation in response to future requests, the cryptographic key being received from the trusted key custodian in encrypted form, the computing device storing instructions of the protected application within a secure memory, wherein the secure memory is allocated and managed by a chip set of the computing device;
    sending, by the protected application to a hardware security module (HSM), a request to decrypt the cryptographic key;
    receiving, by the protected application from the HSM, the cryptographic key as decrypted by the HSM;
    generating, by the chip set, an encrypted key using the cryptographic key as decrypted by the HSM;
    receiving, at a network interface of the computing device from a requesting device, a first request to perform the cryptographic operation on first data in the first request;
    retrieving, by the protected application using the chip set, the encrypted key from the secure memory;
    performing, by the protected application, the cryptographic operation on the first data using the encrypted key to obtain encrypted first data; and
    sending the encrypted first data to the requesting device.

2. The computer-implemented method of claim 1, further comprising:
    receiving, at the network interface of the computing device from the requesting device, encrypted second data;
    retrieving, by the protected application using the chip set, the encrypted key from the secure memory;
    decrypting, by the protected application and the chip set, the encrypted second data to obtain decrypted second data; and
    sending the decrypted second data to the requesting device.

3. The computer-implemented method of claim 1, wherein the the hardware security module is distinct from the computing device.

4. The computer-implemented method of claim 1, further comprising:
    encrypting, by the chip set, the cryptographic key using a device-specific key to obtain the encrypted key; and
    storing the encrypted key in the secure memory managed by the chip set of the computing device.

5. The computer-implemented method of claim 1, wherein contents of the secure memory are cryptographically hashed by the chip set utilizing a device-specific key.

6. The computer-implemented method of claim 1, wherein a process of the protected application is allowed access to the secure memory by the chip set, and wherein access the secure memory by a second process is restricted by the chip set, the second process being associated with a different application.

7. The computer-implemented method of claim 1, further comprising:
    establishing, by the protected application, a secure communications channel with the HSM, wherein sending the request to decrypt the cryptographic key is sent via the secure communications channel,
    and wherein the cryptographic key as decrypted by the HSM is received over the secure communications channel in response to the request.

8. The computer-implemented method of claim 1, wherein the cryptographic key is received as part of an initialization process associated with the protected application.

9. A computing device for performing a cryptographic operation comprising:

a hardware processor; and one or more computer readable medium storing instructions that, when executed by the hardware processor, cause the computing device to perform operations comprising:

receiving, at a protected application executing on the computing device from a trusted key custodian, a cryptographic key to be used in performing the cryptographic operation in response to future requests, the cryptographic key being received from the trusted key custodian in encrypted form, the computing device storing instructions of the protected application within a secure memory, wherein the secure memory is allocated and managed by a chip set of the computing device;

sending, by the protected application to a hardware security module (HSM), a request to decrypt the cryptographic key;

receiving, by the protected application from the HSM, the cryptographic key as decrypted by the HSM;

generating, by the chip set of the computing device, an encrypted key using the cryptographic key as decrypted by the HSM;

receiving, at a network interface of the computing device from a requesting device, a first request to perform the cryptographic operation on first data in the first request;

retrieving, by the protected application using the chip set, the encrypted key from the secure memory;

performing, by the protected application and the chip set, the cryptographic operation on the first data using the encrypted key to obtain encrypted first data; and sending the encrypted first data to the requesting device.

10. The computing device of claim 9, the instructions further causing the computing device to perform operations comprising:

receiving, at the network interface of the computing device from the requesting device, encrypted second data;

retrieving, by the protected application using the chip set, the encrypted key from the secure memory;

decrypting, by the protected application and the chip set, the encrypted second data to obtain decrypted second data; and sending the decrypted second data to the requesting device.

11. The computing device of claim 9, wherein the hardware security module is distinct from the computing device.

12. The computing device of claim 9, the instructions further causing the computing device to perform operations comprising:

encrypting, by the chip set, the cryptographic key using a device-specific key to obtain the encrypted key; and storing the encrypted key in the secure memory managed by the chip set of the computing device.

13. The computing device of claim 9, wherein contents of the secure memory are cryptographically hashed by the chip set utilizing a device-specific key.

14. The computing device of claim 9, wherein a process of the protected application is allowed access to the secure memory by the chip set, and wherein access the secure memory by a second process is restricted by the chip set, the second process being associated with a different application.

15. The computing device of claim 9, the instructions further causing the computing device to perform operations comprising:

establishing, by the protected application, a secure communications channel with the HSM, wherein sending the request to decrypt the cryptographic key is sent via the secure communications channel, and wherein the cryptographic key as decrypted by the HSM is received over the secure communications channel in response to the request.

16. The computing device of claim 9, wherein the cryptographic key is received as part of an initialization process associated with the protected application.

* * * * *